United States Patent
Lewis

(10) Patent No.: US 7,511,800 B2
(45) Date of Patent: Mar. 31, 2009

(54) DISTANCE MEASUREMENT DEVICE WITH SHORT RANGE OPTICS

(75) Inventor: Robert Lewis, Bend, OR (US)

(73) Assignee: Robert Bosch Company Limited, Hong Kong (CN)

( * ) Notice: Subject to any disclaimer, the term of this patent is extended or adjusted under 35 U.S.C. 154(b) by 38 days.

(21) Appl. No.: 11/288,722

(22) Filed: Nov. 28, 2005

(65) Prior Publication Data

US 2007/0121095 A1 May 31, 2007

(51) Int. Cl.
*G01C 3/08* (2006.01)
(52) U.S. Cl. .................................. 356/5.01; 356/5.03
(58) Field of Classification Search ............. 356/3–5.15
See application file for complete search history.

(56) References Cited

U.S. PATENT DOCUMENTS

| | | | | |
|---|---|---|---|---|
| 3,497,695 | A * | 2/1970 | Smith | 250/232 |
| 3,619,058 | A | 11/1971 | Hewlett et al. | |
| 4,521,107 | A | 6/1985 | Chaborski et al. | |
| 5,054,911 | A | 10/1991 | Ohishi et al. | |
| 5,076,687 | A * | 12/1991 | Adelson | 356/4.04 |
| 5,241,360 | A * | 8/1993 | Key et al. | 356/5.12 |
| 6,072,760 | A * | 6/2000 | Shirasu | 369/100 |
| 6,088,085 | A | 7/2000 | Wetteborn | |
| 6,233,045 | B1 * | 5/2001 | Suni et al. | 356/28.5 |
| 6,259,516 | B1 * | 7/2001 | Carter et al. | 356/442 |
| 6,538,243 | B1 * | 3/2003 | Bohn et al. | 250/208.1 |
| 6,624,899 | B1 * | 9/2003 | Clark | 356/614 |
| 2005/0152694 | A1 * | 7/2005 | Chown | 398/30 |
| 2005/0241209 | A1 * | 11/2005 | Staley, III | 42/111 |
| 2007/0105494 | A1 * | 5/2007 | Lin | 454/299 |

FOREIGN PATENT DOCUMENTS

GB 2272123 A 5/1994

OTHER PUBLICATIONS

Amendment, dated Aug. 28, 2008, U.S. Appl. No. 10/414,440, filed Apr. 15, 2003.
Notification Concerning Transmittal of International Preliminary Report on Patentability and the Written Opinion, dated Jun. 12, 2008, PCT Appln. No. PCT/US2006/045430, filed Nov. 27, 2006.
Office Action, dated May 9, 2008, U.S. Appl. No. 10/414,440, filed Apr. 15, 2003.
Supplementary European Search Report dated Oct. 20, 2008, European Patent Application No. EP 03721734.6.
Supplementary European Search Report dated Oct. 20, 2008, European Patent Application No. EP 03726308.4.

* cited by examiner

*Primary Examiner*—Thomas H Tarcza
*Assistant Examiner*—Timothy A Brainard
(74) *Attorney, Agent, or Firm*—Vierra Magen Marcus & DeNiro LLP

(57) ABSTRACT

Technology is disclosed for measuring distances. A measurement device emits a beam that reflects on the surface of an object. The measurement device determines the distance to the object, based on the time of flight of the beam from transmission to capture by the measurement device. The device includes a light source adapted to provide an outgoing reference beam. A detector is aligned to receive a return beam, wherein said return beam results from a reflection of said outgoing reference beam from an object outside of said distance measurement device. A diffuser is provided adjacent to the detector aligned to receive said return beam.

22 Claims, 12 Drawing Sheets

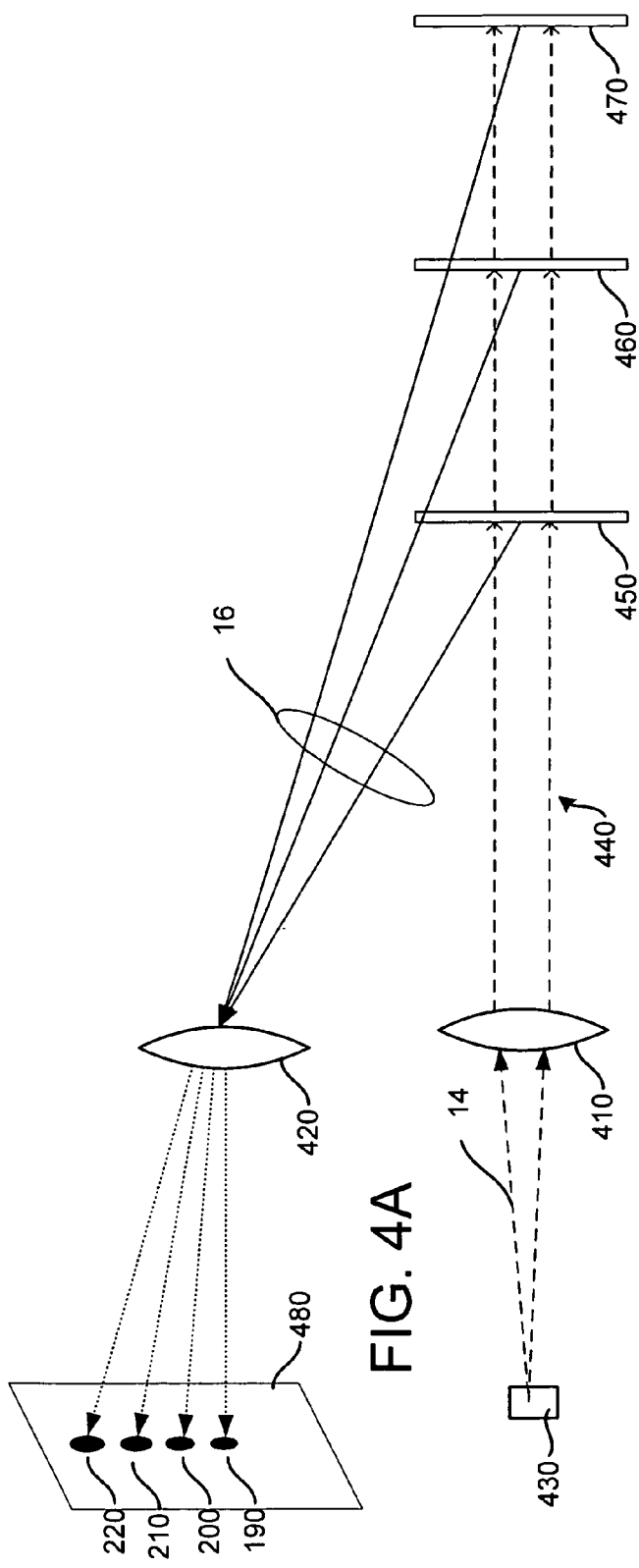
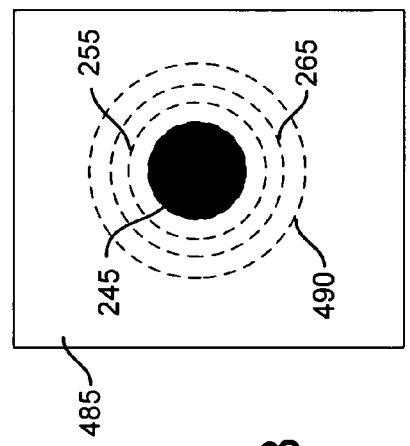
FIG. 4A
FIG. 4B

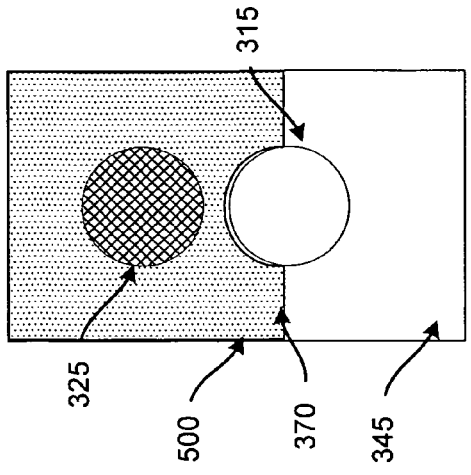
FIG. 14C
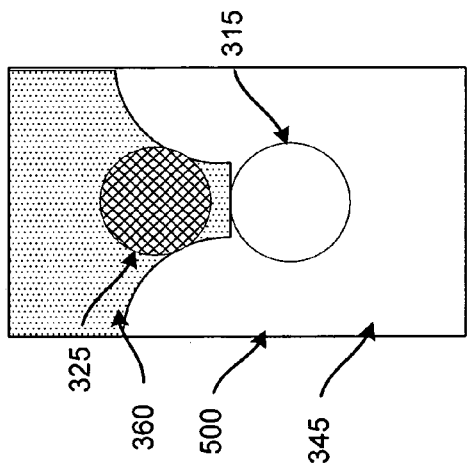
FIG. 14B
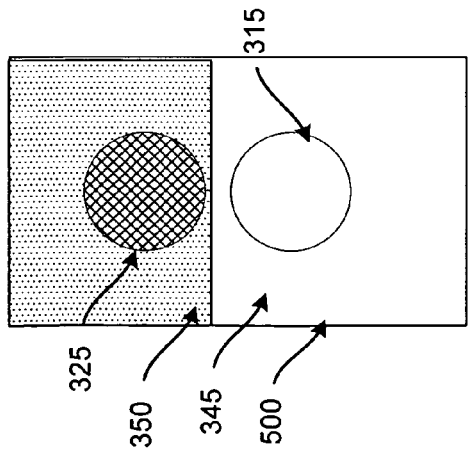
FIG. 14A
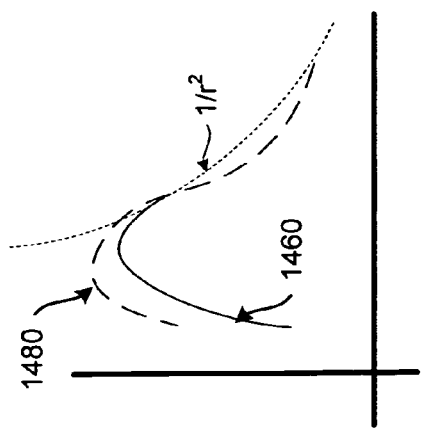
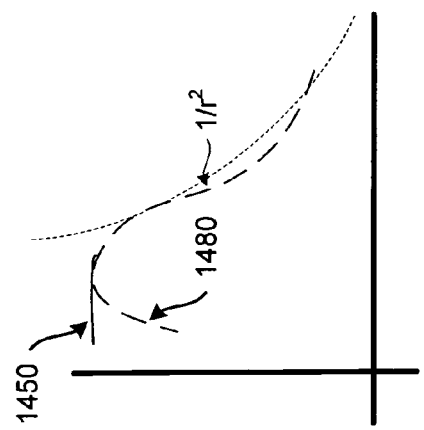
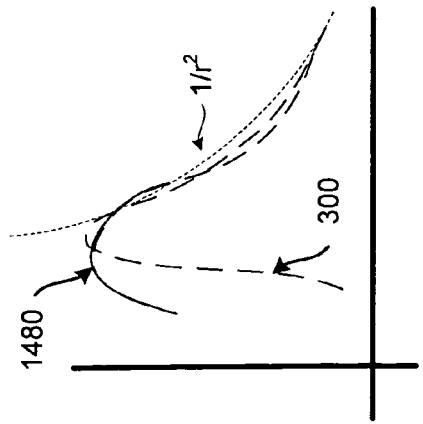

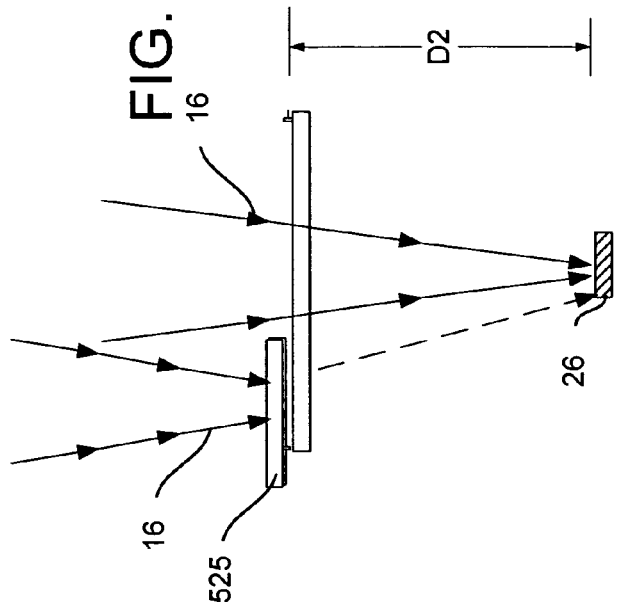
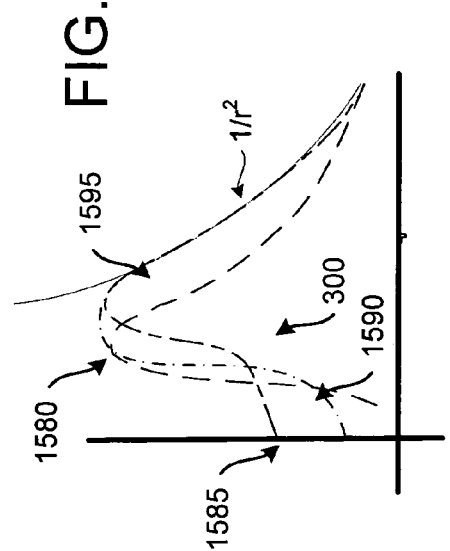
FIG. 15A
FIG. 15B
FIG. 15C

DISTANCE MEASUREMENT DEVICE WITH SHORT RANGE OPTICS

CROSS REFERENCE TO RELATED APPLICATION

This Application is related to the following Application: U.S. patent application Ser. No. 10/414,440 entitled Distance Measuring Device, filed Apr. 15, 2003, by Robert Lewis, Chad Thompson and George Varian, hereby fully incorporated by reference herein.

BACKGROUND

Optical measuring systems exist for making more accurate distance measurements. One traditional type of system is the narrowband ranging system. This system emits one or more modulated optical signals that produce reflections on an incident target. The system captures the reflections and determines the distance to the target based on phase shifts detected in the captured reflections. These systems typically require the use of an expensive high precision receiver, such as an avalanche gain photodiode. The performance of these systems can also erode as the signal to noise ratio falls. This can be a significant drawback, because environmental conditions in the working area can provide substantial signal attenuation.

Another traditional type of system is the wideband pulsed system. This system also emits one or more optical signals that produce reflections on an incident target. The system captures the reflections and measures the round trip signal delay to obtain the distance to the target. The system determines the time difference between the time a signal pulse departs the system and the time that the system receives a reflection of the pulse. Traditional systems identify pulse departure and arrival through threshold detection i.e. comparing the signals to a threshold level. One typical technique is half-maximum detection, which establishes a reference threshold based on the peak intensity of the signal pulses. Unfortunately, this technique does not operate well in low signal to noise ratio environments. The system has difficulty establishing a consistent detection point, because the low signal to noise ratio increases estimation errors in the measurement of signal amplitude. Challenges also arise when trying to measure time delay between signal pulses. When an asynchronous clock is employed to measure the time between pulses, significant inaccuracies can occur unless the system employs measurement intervals with impractically long durations. In order to avoid such measurement intervals, the system can employ expensive high-speed components with substantial power consumption.

Co-pending U.S. patent application Ser. No. 10/414,440 entitled Distance Measuring Device, filed Apr. 15, 2003, describes a number of embodiments of a "time of flight" distance measuring device. The device emits a beam that reflects on the surface of an object. The measurement device captures the return beam and determines the distance to the object, based on the time of flight of the beam from transmission to capture by the measurement device.

One implementation of the measurement device enhances accuracy by deriving feedback reference pulses from pulses in the emitted beam and injecting them into the device's receive path. This creates a receive waveform that includes one or more feedback reference pulses in the emitted beam and corresponding return pulses in the return beam. This enables the measurement device to directly measure time delay between a return pulse and a reference pulse that lead to the generation of the return pulse.

A variety of problems are encountered in optical ranging systems when the range being measured is decreased. For a beam that is contained within the field of view of the receiver, there is a $1/R^2$ relationship between the return signal strength and the distance (where R is the distance of the reflected beam from the detector). To obtain measurements at short distances, a large dynamic range in the reflected beam is required. This adds complexity to signal detection and processing circuitry. In systems with separate transmit and receive apertures, decreasing the distance measured eventually causes a drop off in signal strength at the returned detector. This signal drop off occurs as the received signal moves off of the active surface of the detector. For time of flight ranging systems requiring wide detection bandwidths, a large detector is not feasible. This means other techniques must be available to prevent a short range signal dropout. In time of flight range finders incorporating pulsed laser diodes, such as that described in the co pending application cited above, there is often a dependence of the time behavior of the return signal on the distribution of the return signal falling on the detector. If only a portion of the return signal falls on the detector, as experienced at short distances, changes in the pulse shape can result.

Aspects of the present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

SUMMARY

In one embodiment, the invention includes distance measurement device. The device includes a light source adapted to provide an outgoing reference beam; a detector aligned to receive a return beam, wherein said return beam results from a reflection of said outgoing reference beam from an object outside of said distance measurement device; and a diffuser provided adjacent to the detector aligned to receive said return beam.

In an alternative embodiment, the invention is a distance measurement device. The invention includes a light source adapted to provide a beam and a beam splitter aligned to receive said beam and generate an internal reference beam. A detector is aligned to receive said feedback reference beam and a return beam. The return beam results from a reflection of an outgoing reference beam from an object outside of said distance measurement device and said outgoing reference beam is derived from said beam. A diffuser is provided adjacent to the detector aligned to receive said return beam.

The return beam has a position dependent on a distance of said object, and wherein the diffuser is aligned to receive said return beam when said distance is within a given range of about 0.2 to 5 meters.

This Summary is provided to introduce a selection of concepts in a simplified form that are further described below in the Detailed Description. This Summary is not intended to identify key features or essential features of the claimed sub-

BRIEF DESCRIPTION OF THE DRAWINGS

FIG. 4A is an illustration of a reflected ray bundle impinging a target block at varying distances of a reflecting object.

FIG. 4B is an illustration of an outbound ray bundle at each reflecting object.

FIGS. 14A-14C illustrate varying cross sections of diffraction structures in accordance with the teachings herein FIGS. 15A-15C illustrate the effect of moving a detector relative to a diffraction grating in accordance with the present invention.

DETAILED DESCRIPTION

Figure 1:
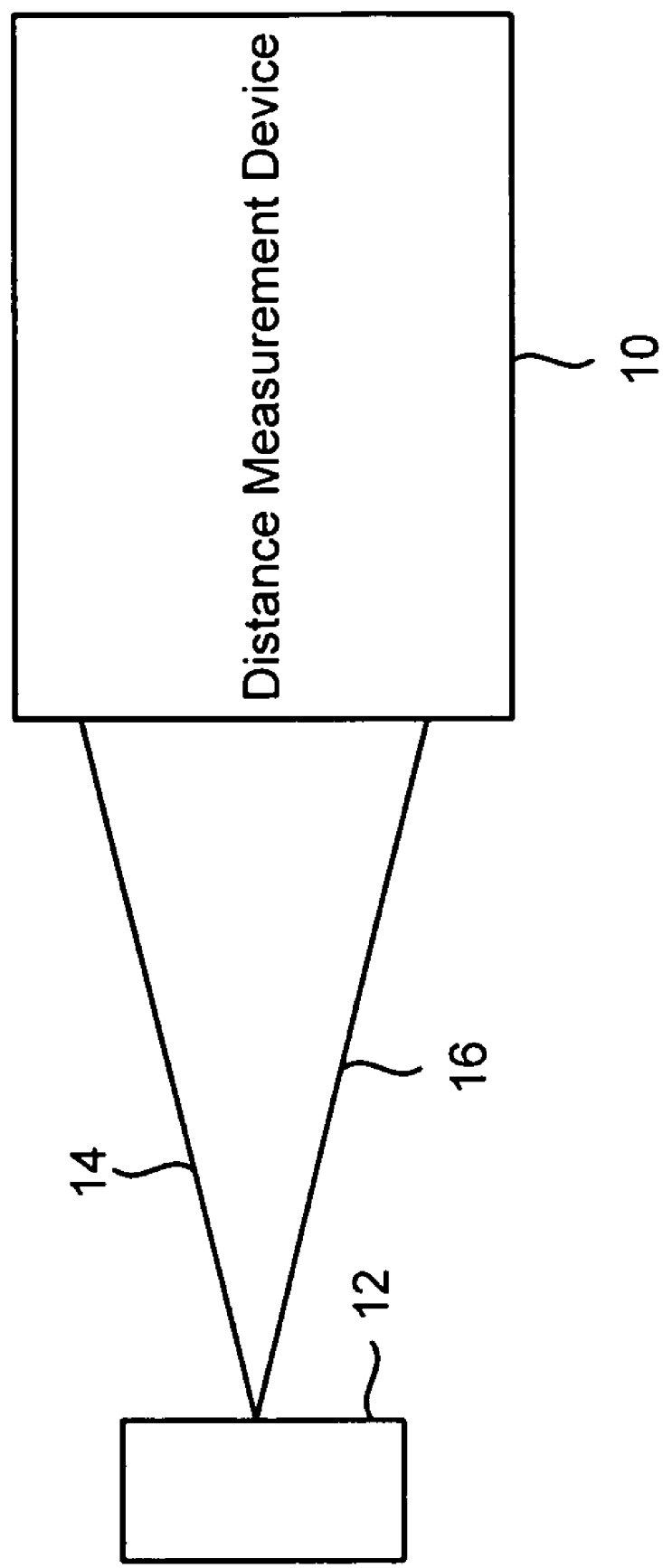
FIG. 1 shows a distance measurement device in accordance with the present invention.

FIG. 1 shows a distance measurement device 10. The distance measuring device 10 may be implemented in accordance with the teachings herein and those discussed in co-pending U.S. patent application Ser. No. 10/414,440 entitled Distance Measuring Device, filed Apr. 15, 2003, which is hereby fully incorporated herein by reference.

Distance measurement device 10 is capable of measuring the distance from device 10 to object 12. In one implementation, measurement device 10 can measure distances from 30 meters to 2 millimeters ("mm"). In alternate implementations, different distance measurement ranges are possible. One version of measurement device 10 measures distances with an accuracy of plus or minus 2 mm.

Measurement device 10 emits beam 14, which reflects on the surface of object 12. The reflection of beam 14 returns to measurement device 10 as beam 16. Measurement device 10 determines the distance to object 12, based on the time delay between the transmission of beam 14 and reception of beam 16. In alternate embodiments, measurement device 10 provides a common point of exit and entry for beams 14 and 16. This can be particularly useful in making measurements at short distances.

Measurement device 10 achieves high levels of accuracy without requiring the use of expensive high precision components in some embodiments. This results in lower production costs for manufacturing device 10. Measurement device 10 enhances accuracy by employing a reference pulse feedback path—one or more reference pulses from beam 16 are injected into the receive path that captures beam 16. This creates a receive waveform with reference and return pulses. Device 10 uses the waveform to match points on return pulses in beam 16 with points on reference pulses in beam 14 that generated the return pulse points. Device 10 measures the distance between the corresponding points to determine the time of flight for the emitted signal and converts the time of flight into a distance measurement.

In one implementation, device 10 attenuates the reference pulses from beam 14 in the feedback path. This causes the reference pulse rise and fall times to be the same or very similar to the rise and fall times on return pulses in beam 16. This enhances the ability of device 10 to accurately match return pulse points to reference pulse points when determining time of flight.

One embodiment of device 10 employs a histogram processing module to digitize waveforms with reference and return pulses. This histogram processor collects waveform samples at varying comparison thresholds. The processor uses the most accurate information at each threshold to create a digitized composite waveform that corresponds to the analog waveform received by measurement device 10. The histogram processor facilitates the use of device 10 in environments with low signal to noise ratios.

In some embodiments, measurement device 10 also includes a digital signal processing module that processes the digitized composite waveform. The processing enables better matching of points on return pulses with corresponding points on reference pulses, so that accurate time delay can be measured. In one embodiment, the digital signal processing removes noise, scales reference pulses, and removes distortions caused by pulse trailing edges running into subsequent pulses.

Figure 2:
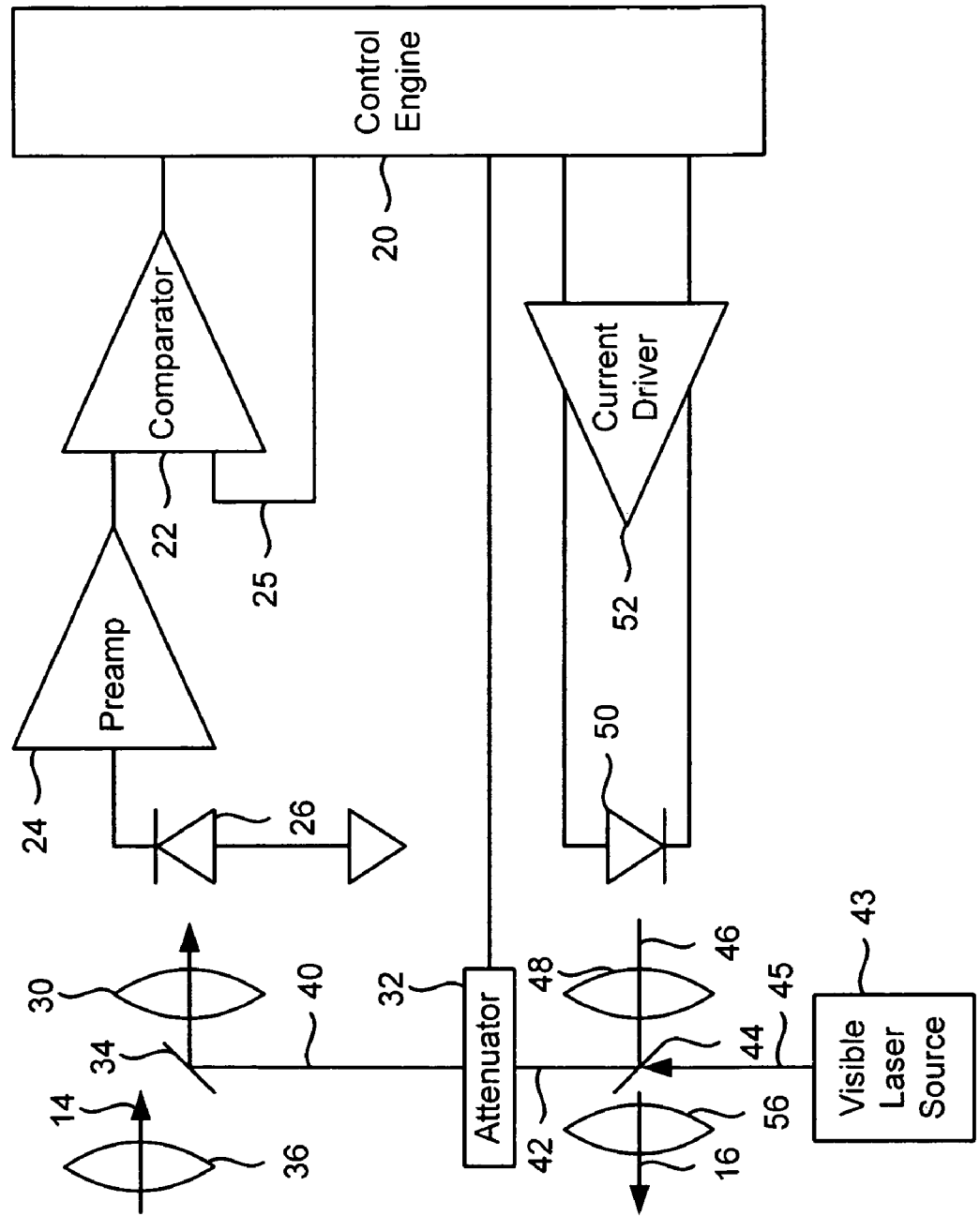
FIG. 2 shows a block diagram of one embodiment of a distance measurement device in accordance with the present invention.

FIG. 2 is a block diagram of one implementation of measurement device 10. Measurement device 10 includes current driver 52 coupled to light source 50. In one implementation, light source 50 is a laser source, such as a laser diode, that provides an invisible infrared signal. In an alternate embodiment, laser source 50 is a VCSEL or different type of laser diode. Light source 50 can also be a light emitting diode for low cost applications in one implementation. Current driver 52 drives laser source 50 to generate laser beam 46. In further embodiments, source 50 can provide light other than invisible laser light. Current driver 52 has ability to provide either a single differential pulse or burst of differential pulses to source 50. In response, source 50 provides either a single pulse or burst of pulses in beam 46.

Collimating lens 48 is aligned with source 50 to capture beam 46 and pass it to beam splitter 44, which has a surface that is partially reflective and partially transmissive. Beam splitter 44 divides beam 46 into outgoing reference beam 16 and internal reference beam 42. Window 56 is aligned with beam splitter 44 to capture beam 16 and direct it out of device 10. In one implementation, device 10 includes laser source 43, which supplies visible laser beam 45. In this implementation, beam splitter 44 is a dichroic mirror that receives beam 45 and reflects beam 45 out of window 16. The outgoing visible beam allows users to align device 10 with target 12. A dichroic mirror passes most of incident infrared beam 46, while reflecting a small portion of infrared beam 46 to generate beam 42. The dichroic mirror also reflects essentially all of visible beam 45. Beam splitter 44 is aligned so that beam 16 and the portion of beam 45 reflected by mirror 44 are co-bore sited.

Attenuator 32 is aligned with beam splitter 44 to receive internal reference beam 42. Attenuator 32 applies an intensity attenuation to beam 42 to generate feedback reference beam 40. Reflector 34 is aligned with attenuator 32 to receive feedback reference beam 40. Feedback reference beam 40 impacts a surface of mirror 34 and is reflected. In one embodiment, reflector 34 is a mirror. Alternatively, reflector 34 can be implemented with other instrumentalities. In other embodiments, attenuator 32 is not employed—internal reference beam 42 is directed onto reflector 34. Collimating lens 30 is aligned with mirror 34 to receive reflected feedback reference beam 40. Return beam 14 enters device 10 through window 36. Return beam 14 bypasses reflector 34 and is captured by lens 30. In one embodiment, device 10 includes a filter (not shown) that captures beam 14 before lens 30 and filters out ambient light. In an alternate embodiment, no filter is employed. In a further embodiment, mirror 34 is a partially transmissive beam splitter that receives beam 14 and passes beam 14 to lens 30.

The feedback reference pulses in beam 40 and return pulses in beam 14 appear in a waveform that is incident on detector 26. In one implementation, detector 26 is a silicon photo diode with an anode coupled to ground and a cathode coupled to an input of preamplifier 24. Laser diode 26 detects incoming signals through lens 30. Preamplifier 24 receives the output of laser diode 26 and amplifies the incoming waveform. The output of preamplifier 24 is coupled to the input of comparator 22, which has input 25 coupled to control engine 20. Control engine 20 places a threshold voltage on comparator input 25. Comparator 22 compares the waveform from preamplifier 24 to the threshold voltage. When the waveform exceeds the threshold on input 25, comparator 22 provides a logic 1 signal output. Otherwise, comparator 22 provides a logic 0 output.

Control engine 20 is coupled to the output of comparator 22, threshold input 25, the input of current driver 52, and a control input of attenuator 32. Control engine 20 controls the operation of current driver 52—setting the amplitude, duration, intensity and number of pulse signals used to generate output pulses on source 50. Control engine 20 sets the amount of attenuation that attenuator 32 provides to reference beam 42. In one implementation, optical attenuator 32 is an electronically controlled attenuator, such as a device including liquid crystal shutter. Attenuator 32 electronically adjusts the attenuation in response to control signals from control engine 20. In alternate embodiments, attenuator 32 mechanically adjusts the attenuation in response to signals from control engine 20. In one implementation, attenuator 32 drives the operation of a mechanical actuator, which sets an opening in a mechanical shutter. In alternate embodiments, different instrumentalities can be employed to perform the operation of attenuator 32.

Control engine 20 sets optical attenuator 32, so that the intensity of the pulses on feedback reference beam 40 are close to or the same as the intensity of pulses on return beam 14. The matched intensity allows the reference pulses and return pulses to have similar or the same rise and fall times on their leading and trailing edges. This enable the reference pulses and return pulses to experience the same propagation delay when passing through preamplifier 24 and comparator 22—allowing corresponding points on the reference and return pulses to be easily matched when assessing time of flight.

Control engine 20 uses the signals from comparator 22 to construct digital versions of the waveforms received by detector 26. In one implementation, control engine 20 employs a histogram processing module. The histogram processor collects multiple samples of a waveform at different intervals within the waveform. The histogram processor collects this data for different threshold values on comparator input 25. For each threshold value, the histogram processor collects samples from multiple waveforms with reference and return pulses.

The histogram processor accumulates the samples of each interval in a waveform at a given threshold. This results in a histogram for each threshold voltage provided on comparator input 25. Each histogram identifies the number of logic 1 determinations made by comparator 22 within each waveform interval at a given threshold. Control engine 20 aggregates the histogram information at each threshold to create a composite waveform that serves as a digital replication of the waveform received at laser diode 26. Control engine 20 employs the digitized waveform to identify reference pulses and their corresponding return pulses to make time of flight measurements. As indicated above, control engine 20 applies digital signal processing to the digitized waveform to more accurately measure time of flight. More details regarding these operations are provided below. In alternate embodiments, different forms of histogram processing can be employed.

Figure 3:
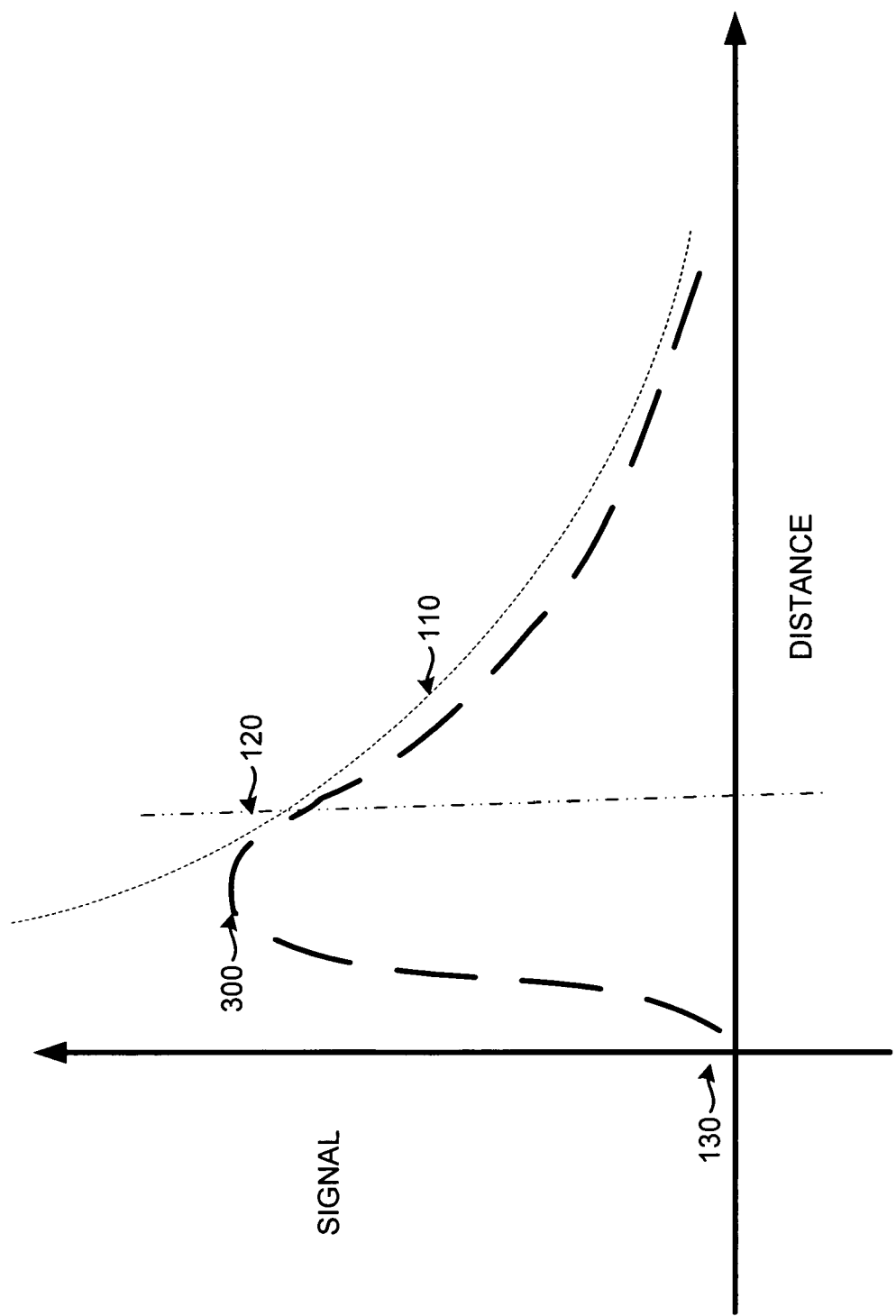
FIG. 3 is a graph of a reflected signal on a detector relative to the distance of a reflected object.

FIG. 3 illustrates the change in reflected beam 16 signal strength on a detector versus distance of the target 12. FIG. 3 illustrates the curve 300 of performance typically seen in time of flight range finder described in the various optical embodiments described in co-pending U.S. patent application Ser. No. 10/414,440. Curve 110 shows the $1/R^2$ ideal relationship between distance and signal strength. Line 120 marks the transition from this ideal relationship to the characteristic drop-off due to the received reflected beam 16 image moving off of a detector.

The transition point 120 between good signal characteristics and the drop-off at shorter distances is governed by a number of factors, including: the physical separation between the optical apertures; the characteristics of the transmit beam, the characteristics of the receive lens, the detector size and shape, and the detector position. As distance is decreased toward point 130, the signal can drop out entirely due to the complete movement of the received beam off the active region of the detector. Sometimes, the signal does not drop off completely due to scattering of energy on the surfaces within the receiving structure. Typically, the random scattering of energy in the receiver beam path results in inadequate signal strength and distortion in the detected pulse shape.

FIGS. 4A and 4B illustrate properties of a transmitted and reflected beam at various distances. FIG. 4A shows an ideal optical system consisting of a transmit lens 410, an aperture 410, a beam source 430 and various targets 450, 460, 470. The characteristics of the reflected beam on an image plane 480 are illustrated and discussed. A laser light source 430 produces energy which is collected and focused by the transmit lens 410. An outgoing beam 440 is reflected off targets 450, 460 and 470. These targets are at various distances from lens 410.

FIG. 4B illustrates the projection of the size of the beam at the transmit aperture 410 and at the various target positions is shown in solid and dashed lines on an idealized target stream 485 in FIG. 4B. The solid circle in FIG. 4B is marked as 245 indicates the size of the beam at the transmit aperture 410. Circle 255 is the beam outline at target position 450, outline 265 at target position 460 and outline 490 at target position 470. The dotted circle 255 is only slightly larger than circle 245 due to only a small contribution of beam divergence to the size of the beam. However, at longer distances, the size of the beam begins to follow the divergence of the beam and this condition is often referred to as the far field behavior of the beam.

In two aperture phase or pulsed range finders, the received signal 16 on the image plane 480 experiences both lateral displacement and an increase in size at decreasing distances. Returning to FIG. 4A, images formed by the received lens 420 are shown in the image plane 480. The circle marked as 190 represents the image position at very long ranges where the image size is governed by the blur size of the lens and where lateral displacement is minimal. Images marked by 200, 210, and 220 show the change in size and position at the target positions 470, 460 and 450, respectively. Images 210 and 220 displace laterally and increase in size due to the increasing angular extend of the transmit beam in shorter distances.

In order to compensate for the lateral displacement of the beam, the device of the present invention incorporates a diffuser placed in the received signal path to selectively scatter energy back onto the detector of a range planning system at decreasing range. This is conceptually illustrated in FIG. 5.

Figure 5:
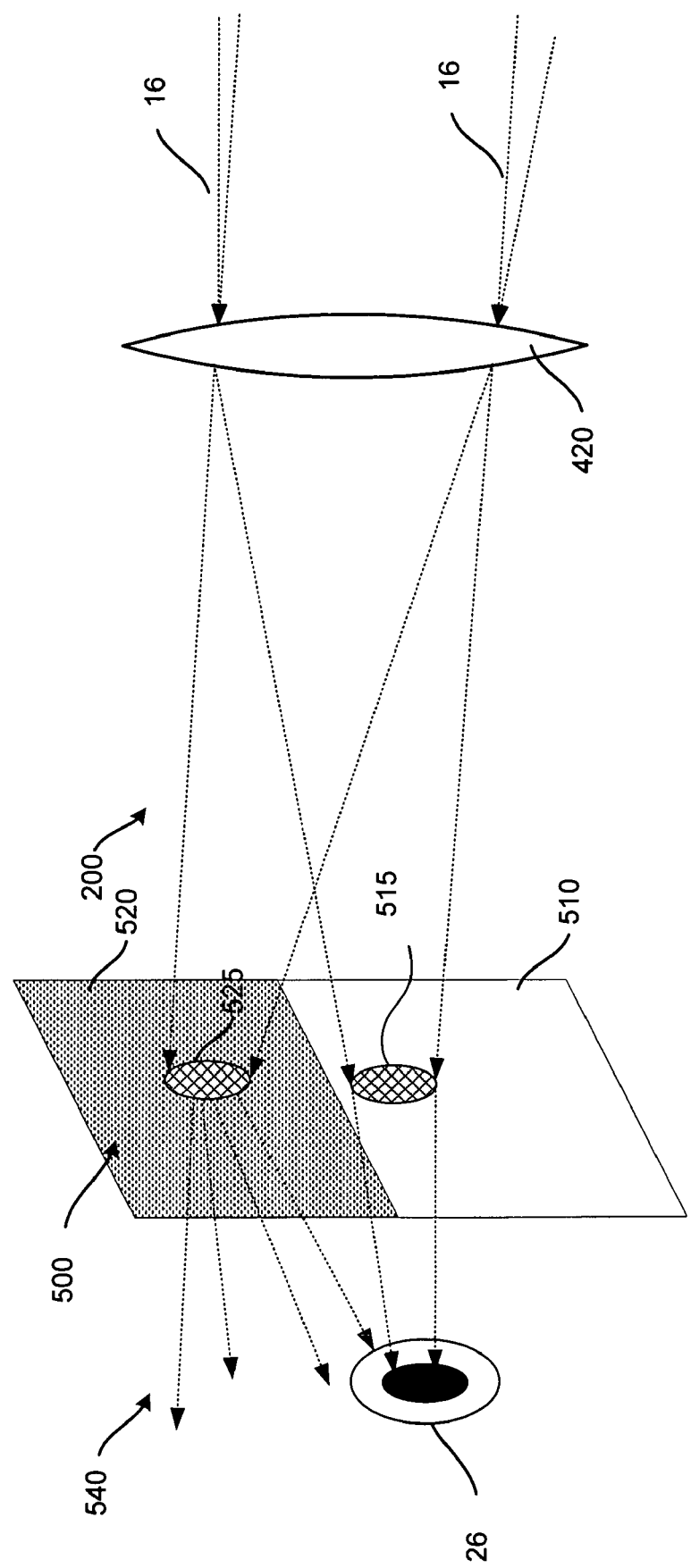
FIG. 5 is a depiction of an ideal optical system in accordance with the present invention.

In FIG. 5, a received lens 420 forms ray bundle converging onto to detector 530. The ray bundle may be a portion of the reflected beam illustrated in FIG. 1. A combined transparent optical mask and diffuser structure 500 is placed in the beam path close to the detector. The optical mask and diffuser structure 500 includes a clear optical mask section 510 and a diffuser section 520.

In general, as the received image at the detector deflects laterally due to parallax, the reflected signal 16 ray path in front of the detector 26 passes into a diffuse region (520) causing energy to scatter back onto the detector 26. Through proper placement of the diffuser (520) and control of the angle and distribution of scattered energy, the received signal strength can be controlled at decreasing distance. As a result, signal strength at decreasing distances can be maintained at an acceptable level. The engineered signal strength behavior decreases the required signal dynamic range in the receiver by reducing the normally experienced signal drop off at short distances while preventing an excessively high signal level often experienced when transitioning from the normal $1/R^2$ relationship to short range operation. The diffused portion of the signal will accurately reflect changes in the spatial distribution of the image received, preventing distance measurement errors due to the partial sampling of the spatial energy distribution on the detector. This scattering of the short range signal prevents distance measurement errors due to changes in the pulse shape as the returned signal image moves off the detector surface.

A typical separation between the optical mask and the detector surface is 1 to 2 millimeters. The optical mask may be placed close to the detector surface to minimize the size of the converging beam for best spatial discrimination with change in image position. There is also a need to obtain a representative sampling of the image energy caused by scattering from the mask surface. A separation exists between the optical mask and the detector surface, which may be advantageously engineered based on the diffuser characteristic, the desired signal strength versus the distance, and the detector size.

A circular cross section 515 illustrates the inner section of the ray bundle from a long distance reflected to target passing through the transparent region 510 of the diffuser and mask structure 500. As target distance is decreased, the ray bundle position moves vertically to position 525, within the diffuser scattering region of 520 of the mask structure 500. Energy from the bundle impinging at region 525 is scattered by the diffused region 520 forming scattered light 540. The angular distribution of the scattered energy can be engineered through a variety of means including diffraction patterns and scattering particles suspended in a transparent medium, to create the desired reflected signal characteristic at given distances.

In one embodiment, the boundary between the scattering region 520 and transparent region 510 is placed in close proximity to the nominal ray cross section 515. It is important to have the ray bundle solidly in the scattering region once the image of the target exceeds the nominal blur size of the lens. Once the target image exceeds the blur size of the lens, the spatial distribution of the beam at the target will translate into the distribution energy on the image plane. When the image spills off the active region of the detector due to parallax, partial sampling of the beam can result. This will change the time behavior of the detected signal and since the measurement of distance requires correlation of the received signal to a pre-stored or measured transmitted wave form, the transition between the non scattering and scattering regions should occur at a distance where the spatial distribution of the target image is randomized by the received lens aberrations. Various embodiments of the scattering region of the transparent mask can be used to tailor the signal strength versus distance behavior. Characteristics are discussed below with respect to FIGS. 14 and 15.

Figure 6:
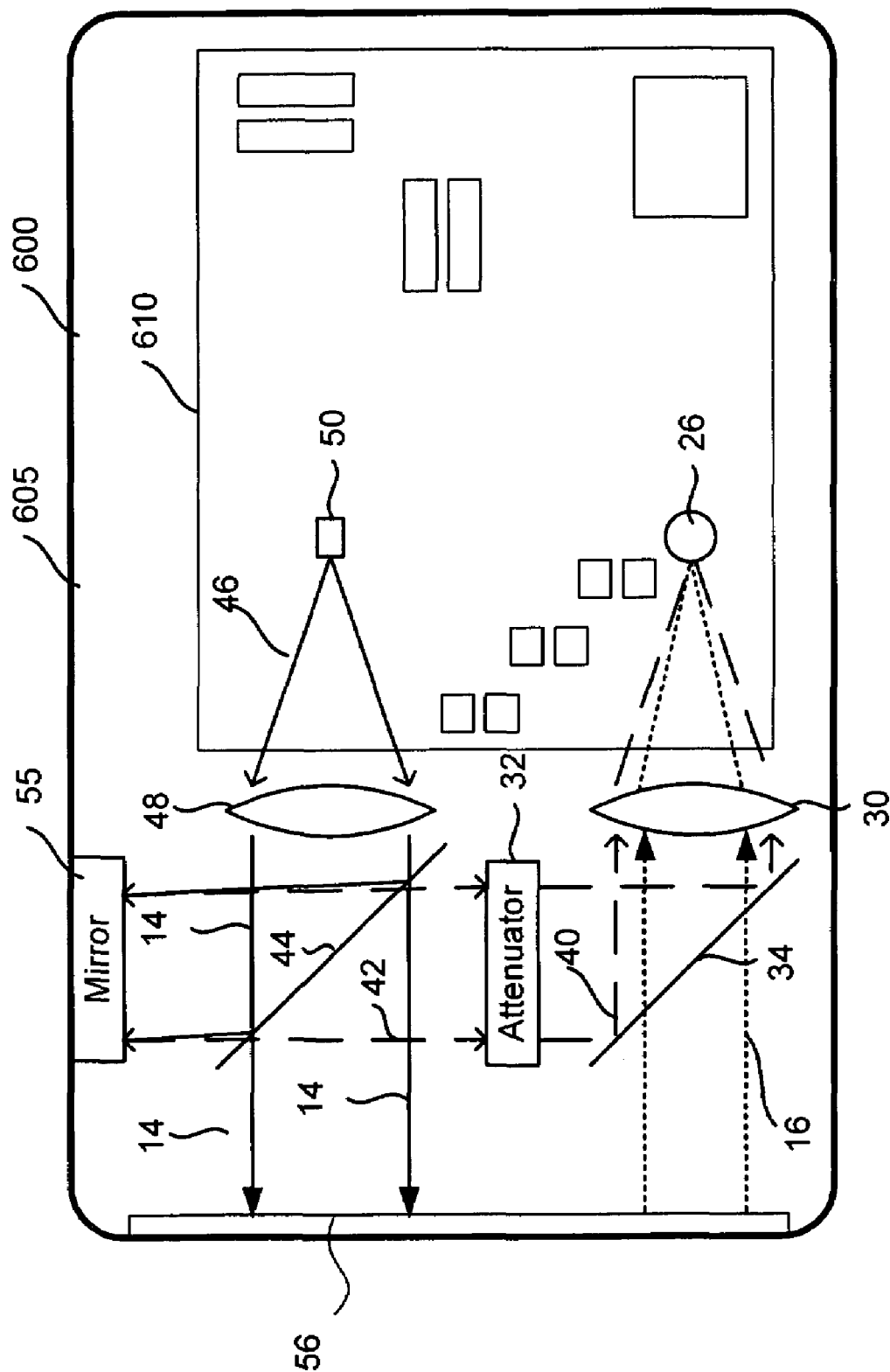
FIG. 6 is a block diagram of one embodiment of a distance measurement device.

FIG. 6 shows a distance measuring device and associated device optic suitable for implementing the present invention. FIG. 6 shows an exemplary physical implementation of the components illustrated schematically in FIG. 3.

FIG. 6 shows one embodiment 600 of device 10 and in particular, the optics in device 10. Device 600 includes a housing 605 incorporating optics and electronics which may comprise the distance measuring device. A printed circuit board 610 is mounted in the housing and includes a light source 50. In one implementation, light source 50 is a laser source, such as a laser diode, that provides an invisible infrared signal. In an alternate embodiment, laser source 50 is a VCSEL or different type of laser diode.

As discussed above with respect to FIG. 2, the PCB includes a current driver 52 having the ability to provide either a single differential pulse or burst of differential pulses to source 50. A collimating lens 48 is positioned with source 50 to capture beam 46 and pass it to beam splitter 44, which has a surface that is partially reflective and partially transmissive. Beam splitter 44 divides beam 46 into outgoing reference beam 14 and internal reference beam 42. A portion of the beam is passed to mirror 55. Window 56 is aligned with beam splitter 44 to capture beam 14 and direct it out of device 10. Attenuator 32 is aligned with beam splitter 44 to receive internal reference beam 42. Reflector 34 is aligned with attenuator 32 to receive feedback reference beam 40. Feedback reference beam 40 impacts a surface of mirror 34 and is reflected. Collimating lens 30 is aligned with mirror 34 to receive reflected feedback reference beam 40. Return beam 16 enters device 600, bypasses reflector 34 and is captured by lens 30. The feedback reference pulses in beam 40 and return pulses in beam 16 appear in a waveform that is incident on detector 26

As noted in FIG. 6, the detector 26 may include a photodiode mounted in a detector structure, which itself is mounted to the PCB. It will be readily understood however that placement of the photodiode and a structure for mounting the diode as hereafter described need not be on a PCB and may take many different forms.

Figure 7:
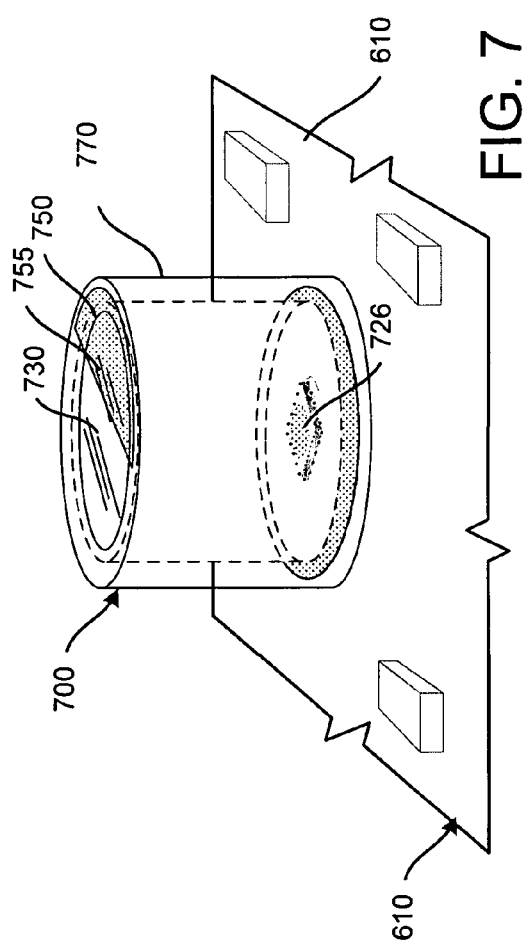
FIG. 7 is a perspective view of a detector formed in accordance with the present invention.
Figure 8:
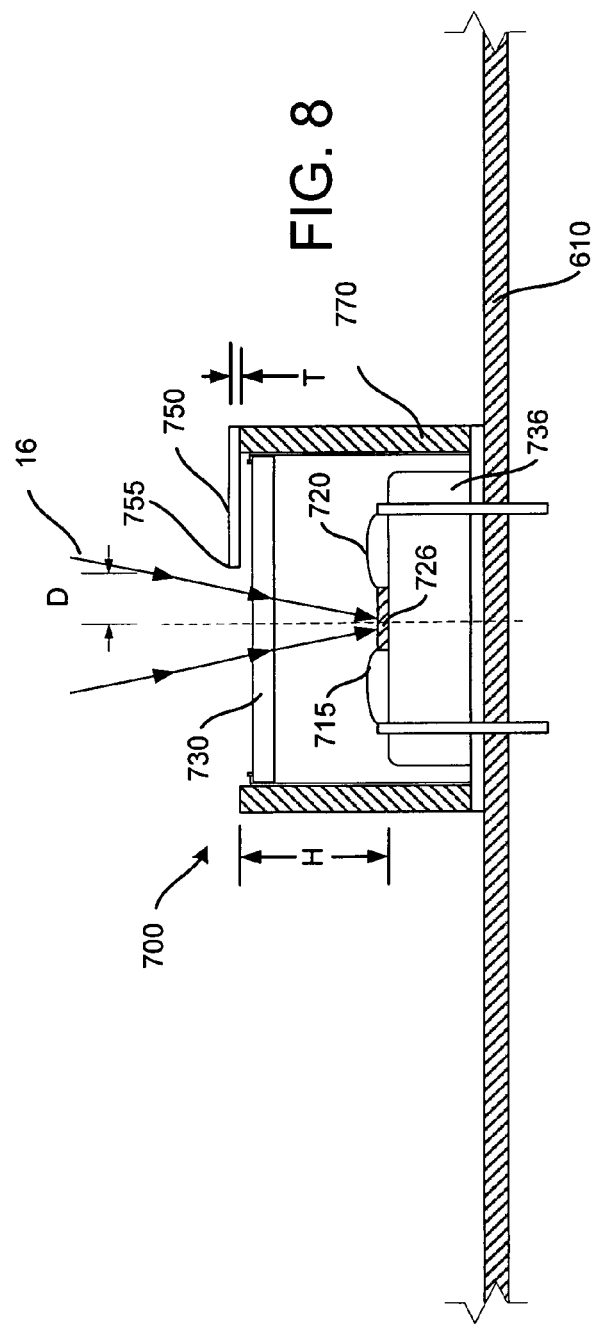
FIG. 8 is a partial side view of the detector of FIG. 7.
Figure 9:
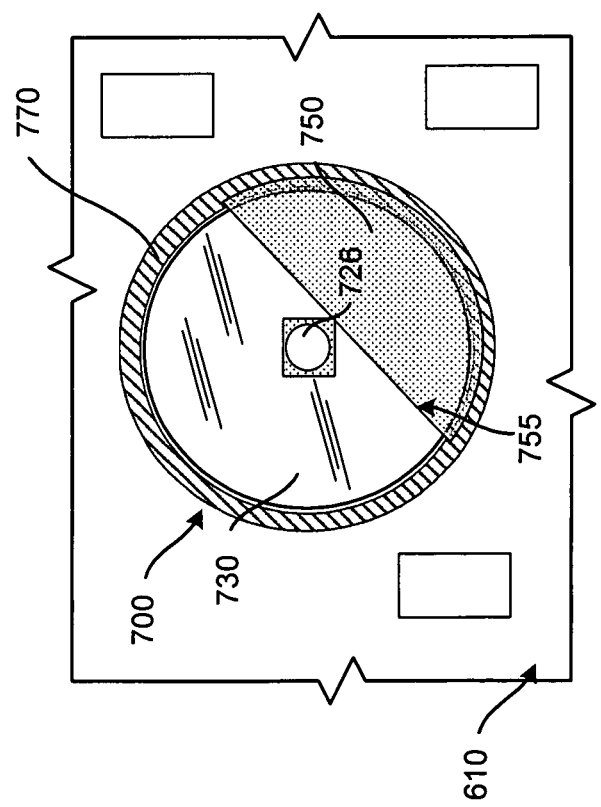
FIG. 9 is a top view of the detector of FIG. 7.

FIGS. 7, 8 and 9 show a first implementation of a detector structure incorporating a diffuser. A diffuser structure 700 is shown as mounted on a circuit board 610. While one structure is shown in FIGS. 7-9, it will be understood that various different types of mounting structures may be utilized.

FIG. 7 is a perspective view of the diffuser structure 700. FIG. 8 is a side, partial cutaway view of the diffuser structure 700 shown in FIG. 7. FIG. 9 is a top view of the diffuser structure 700.

Diffuser structure 700 includes a stamped diffuser 750 mounted on a diffuser support ring 770, which includes a front window 730. The detector 726 is mounted on a detector support 736 and coupled by electrical leads 715, 720 to electronics mounted on printed circuit board 610. In the configuration shown in FIGS. 7, 8 and 9, diffuser 750 is a stamped diffuser formed having a semi circular cross section (as illustrated in FIG. 9) with the demarcation between the diffusing region consisting of the line 755 formed by the diffuser with the photo detector 726 as illustrated in FIG. 9. In one implementation, the diffuser has a thickness of T (FIG. 8) of approximately 125 micrometers, is situated at a height H above the photo detector of approximately 2.5 millimeters, and is separated from the center line of the structure 700 and photo diode 726 by a distance D which ranges between 250 and 500 micrometers.

Figure 10:
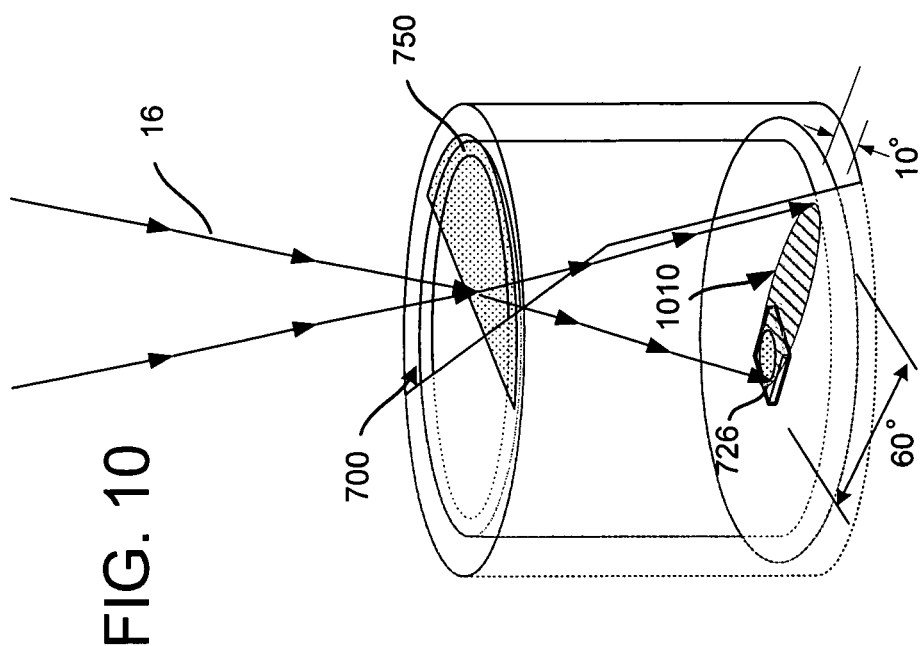
FIG. 10 is a partial perspective view of the detector structure of FIG. 7 illustrating the diffraction characteristics of the detector.
Figure 11:
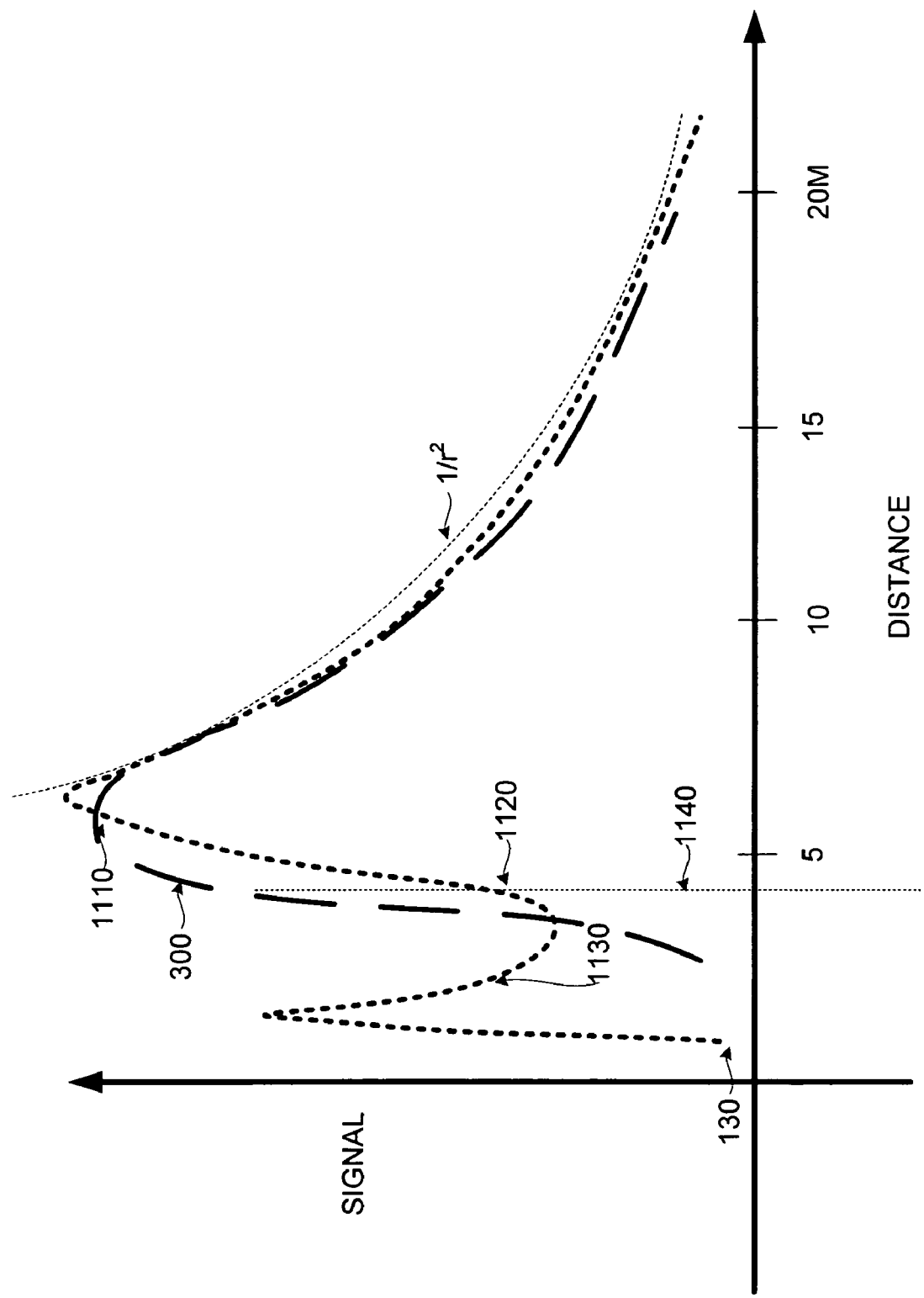
FIG. 11 is a graph of a reflected signal on a detector relative to the distance of a reflected object in a device incorporating the present invention.

FIG. 10 is a partial, perspective cut-away view of the detector structure 700 illustrating the effect of a reflected beam at a short distance impinging the diffuser 750. In this implementation, diffuser 750 has a 10° by 60° diffuser angle fabricated on a 125 micrometer thick polycarbonate film. Such a diffuser may be manufactured by Physical Optics Corporation, Torrance Calif., and is generally referred to as a light shaping diffuser. Light Shaping Diffusers are holographically recorded, randomized surface relief structures that enable high transmissive efficiency and controlled angular distribution. These fully randomized structures are non-wavelength dependent. The precise surface relief structures provide controlled angular light divergence, emulating a negative lens. As illustrated in FIG. 10, the angular distribution of the diffuser is such that the reflected beam 16 impinging on the diffuser will create an image region 1010 a portion of which will impinge the photo diode detector 726. While in FIG. 10 the angular distribution is shown as a 10° by 60° diffuser angle, the diffuser may have an angular distribution in the range of 5 by 30 degrees to 10 by 60 degrees. The signal strength seen by the receiver can be improved by tailoring the diffuser characteristic based on lateral position on the diffuser surface. FIG. 11 shows an example diffuser behavior where the diffuser angle is narrower and oriented towards the detector along the leading edge to increase throughput. As the beam displaces laterally on the diffuser surface the diffusing angle can be increased to prevent an excessive increase of signal strength at decreasing distance.

FIG. 11 illustrates a graph of the signal strength versus distance for a detector structure and distance measuring device manufactured in accordance with the teachings of FIGS. 7 thru 10. As shown therein, line 1100 illustrates the ideal $1/R^2$ relationship of a received, reflected signal. At point 1110, signal drop off occurs as the signal moves off the detector. At point 1120, the signal has moved on to the diffuser and the signal strength begins to increase at point 1130 to a peak at point 1135. FIG. 3 illustrates the signal without the diffuser. As can be seen by a comparison of FIG. 11 with FIG. 3, various aspects of the signal characteristic at short distances (below 10 meters in this embodiment) can be controlled. In addition, the signal pattern illustrated in FIG. 11 can be selectively engineered in accordance with the particular requirements of the distance measuring device being fabricated.

As illustrated in FIG. 11, the range of distances where the return beam is diffused is from about 0-4 meters.

Figure 13:
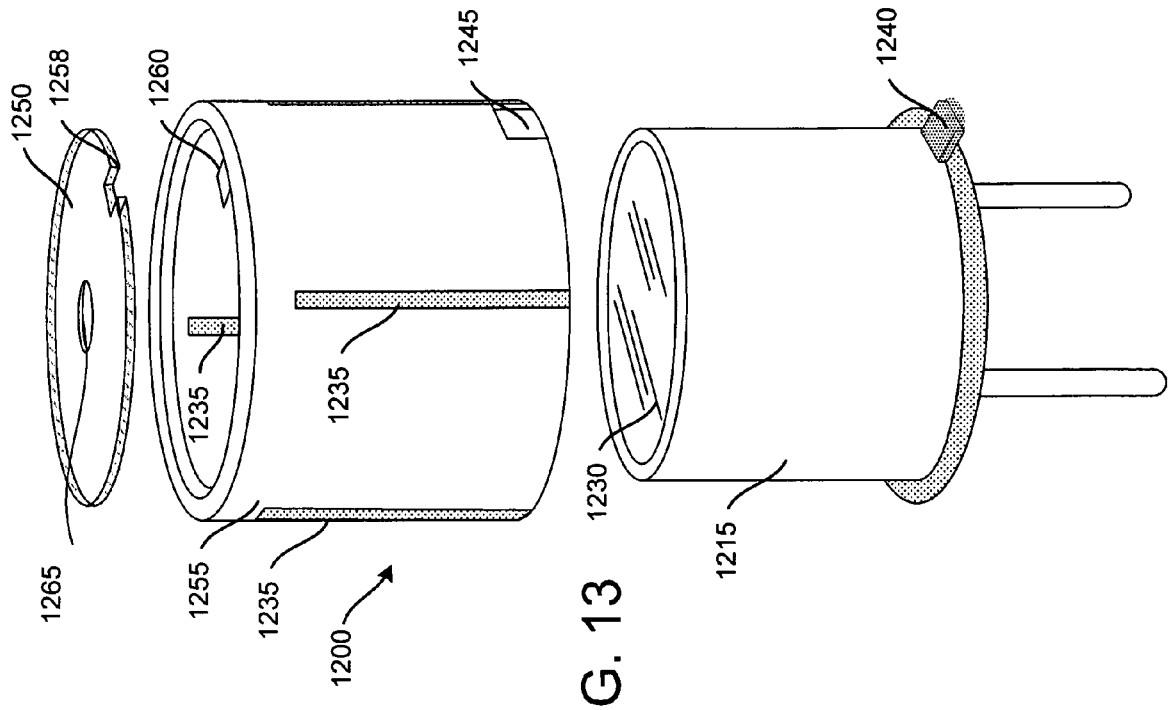
FIG. 13 is an exploded assembly view of the detector structure of FIG. 12.
Figure 12:
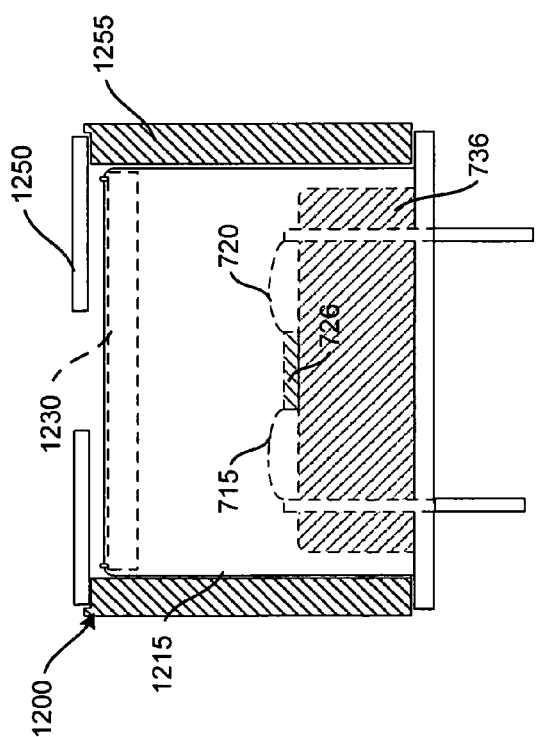
FIG. 12 is a partial side view of an alternative embodiment of a detector.

FIGS. 12 and 13 illustrate an alternative embodiment of the receiving diffuser. FIG. 12 is a partial cutaway view of a diffusing structure 1200 while FIG. 13 is an exploded assembly view of the receiving structure 1200 formed in accordance with this alternative embodiment. The detector is provided in a detector can 1215, the internal components of which including photo diode 726 and diode support structure 736, as well as electrical leads 715 and 720, are equivalent to those set forth above. Detector can 1215 has a transparent window 1230. A diffuser mounting cap 1255 is formed to include an alignment notch 1245 aligning with tab 1240 on detector cap 1215. A laser cut diffuser sheet 1250 is provided on the top of cap 1255 and may be made from polycarbonate, polyester, acrylic, acrylic-uvt or glass. The diffuser includes an alignment notch 1258 designed to mate with an alignment feature 1260 in cap 1255. A center bore 1265 allows reflections from long distances to pass through directly to detector 726. The diffuser 1250 is a circular shape, allowing any orientation of the diffuser relative to the detector structure 1200 and to allow the easy substitution of alternative diffusers of differing shapes and scattering characteristics.

In yet another alternative embodiment, a larger inner diameter from the mounting cap may be used and an additional hole utilized to inject epoxy into the detector area. If the cap is plastic, we can use UU epoxy to securely attach the diffuser to the mounting cap.

FIGS. 14 and 15 illustrate various changes which occur to the characteristics of the detector structure and the scattering region due to a change in the transaction border between the transparent region and the diffuser, and the distance between the diffuser and the detector 26.

FIGS. 14A-14C illustrate the effect of a change in the transition boarder between the transparent region 345 and a diffuser region 350, 360, 370, in a transparent optical mask and diffuser structure 500. These figures illustrate how this transition border can be used to tailor the signal strength versus distance behavior of the reflected beam.

FIGS. 14A, 14B and 14C show three different mask configurations with different boundary transitions. Border 1450 has a straight transition border and as a characteristic response is shown in graph at 1480. Curve 1410 is included to show the theoretical 1 over R2 characteristic.

FIG. 14b shows a tapered boundary wherein the boarder is placed closer to the fully reflected region 325. A less abrupt signal can be produced by the tapered boundary of region 360 shown in FIG. 14B. The curve 1490 shows a less dramatic drop in signal strength with distance versus the original curve 1480.

A more abrupt transition can be accomplished with the opposite border taper as shown in FIG. 14C at line 1370. Curve 1450 reflects this more abrupt characteristic versus the original curve 1480. As will be readily understood, various schemes may be utilized in accordance with the present invention FIGS. 15A-15C show how changing separation between the optical mask 1530 and the detector at the region 1520 can change the short-range behavior of the signal strength versus distance. FIG. 15A shows a first distance D1 separating the detector 26 and the transparent optical mask and diffuser structure 500. FIG. 15B shows a second distance D2, greater than D1, separating the transparent optical mask and diffuser structure 500 and the detector 26.

If the separation distance D is very short, a greater percentage of energy from the scattering surface can reach the detector. The curve 1580 shows a more abrupt and earlier drop from the nominal curve 300 with decreasing distance. The minimum signal at short range is shown by characteristic 1585. A large separation between the detector and mask as shown in illustration 1560 produces less scattered energy to the detector because of the small subtended angle of the detector relative to the angular scattering pattern profiled in the diffuser. Characteristic curve 1595 has a more gradual change in signal strength with decreasing distance, but also the minimal signal strength is lower as shown in region 1590.

As will be understood by those of average skill in the art, many numerous variations on the diffuser concept may be incorporated with the present invention. The present invention provides advantages when used specifically with the detector of co-pending U.S. patent application Ser. No. 10/414,440 However, the merits of the invention are not limited to use with this detector.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A distance measurement device, comprising:
   a light source adapted to provide an outgoing reference beam;
   a diffuser structure having a clear optical region and a beam scattering region each aligned to receive a return beam, wherein said return beam results from a reflection of said outgoing reference beam from an object outside of said distance measurement device;
   a detector aligned to receive said return beam through said clear optical region or said beam scattering region of said diffuser structure depending on a distance of said object from said distance measurement device; and
   a housing enclosing said light source, said detector and said diffuser structure, wherein said housing includes at least one window to allow said outgoing reference beam to exit said housing and allow said return beam to enter said housing.

2. The distance measurement device of claim 1 wherein the return beam strikes said diffuser structure based on a distance of said object from said distance measurement device, and wherein the beam scattering region of the diffuser structure is aligned to receive said return beam when said distance is within a given range of about 5 to 0.2 meters.

3. The distance measurement device of claim 1 wherein the detector is provided in a detector housing, and the diffuser structure is mounted to a portion of the housing.

4. The distance measurement device of claim 3 wherein the beam scattering region if the diffuser structure has a semicircular cross section with a linear edge.

5. The distance measurement device of claim 4 wherein the linear edge is offset a distance from a center line of the detector, the distance being about 250 micrometers-500 micrometers.

6. The distance measurement device of claim 3 wherein the diffuser structure has a circular cross section with a central bore, the central bore providing a non-diffused beam path.

7. The distance measurement device of claim 3 wherein the detector housing includes a printed circuit board, and the detector is mounted on the printed circuit board.

8. The distance measurement device of claim 1 wherein the detector housing is mounted on a printed circuit board.

9. The distance measurement device of claim 1 wherein the angular distribution of the beam scattering region of the diffuser structure is in a range of 5 by 30 to 10 by 60 degrees.

10. The distance measurement device of claim 9 wherein the angular distribution of the beam scattering region of the diffuser structure is 10° by 60°.

11. The distance measurement device of claim 1 wherein the diffuser structure is placed at a height above the detector of about 1 to 3 mm.

12. The distance measurement device of claim 1 wherein the diffuser structure is placed at a height above the detector of about 2500 micrometers-5000 micrometers.

13. The distance measurement device of claim 1 wherein the diffuser structure is placed at a height above the detector of about 2.5 mm.

14. A distance measurement device, comprising:
   a light source adapted to provide a beam;
   a beam splitter aligned to receive said beam provided by said light source and divide said beam into an outgoing reference beam and an internal reference beam;
   a diffuser structure having a clear optical region and a beam scattering region each aligned to receive a return beam and/or said internal reference beam, wherein said return beam results from a reflection of said outgoing reference beam from an object outside of said distance measurement device; and
   a detector aligned to receive said internal reference beam and said return beam through said diffuser structure.

15. The distance measurement device of claim 14 wherein the return beam strikes the beam scattering region of said diffuser structure based on a distance of said object from said distance measurement device, and wherein the beam scattering region of the diffuser structure is aligned to receive said return beam when said distance is within a given range of about 5 to 0.2 meters.

16. The distance measurement device of claim 14 wherein the detector is provided in a detector housing, and the diffuser structure is mounted to a portion of the housing.

17. The distance measurement device of claim 16 wherein the beam scattering region of the diffuser structure has a semicircular cross section with a linear edge.

18. The distance measurement device of claim 17 wherein the edge is a distance from a center line of the detector, the distance being about 250 micrometers-500 micrometers.

19. The distance measurement device of claim 16 wherein the diffuser structure has a circular cross section with a central bore, the central bore providing a non-diffused beam path.

20. The distance measurement device of claim 16 wherein the detector housing includes a printed circuit board, and the detector is mounted on the printed circuit board.

21. The distance measurement device of claim 14 wherein the angular distribution of the beam scattering region of the diffuser structure is in a range of 5 by 30 to 10 by 60 degrees.

22. The distance measurement device of claim 21 wherein the angular distribution of the beam scattering region of the diffuser structure is 10° by 60°.

* * * * *